Figure 1:
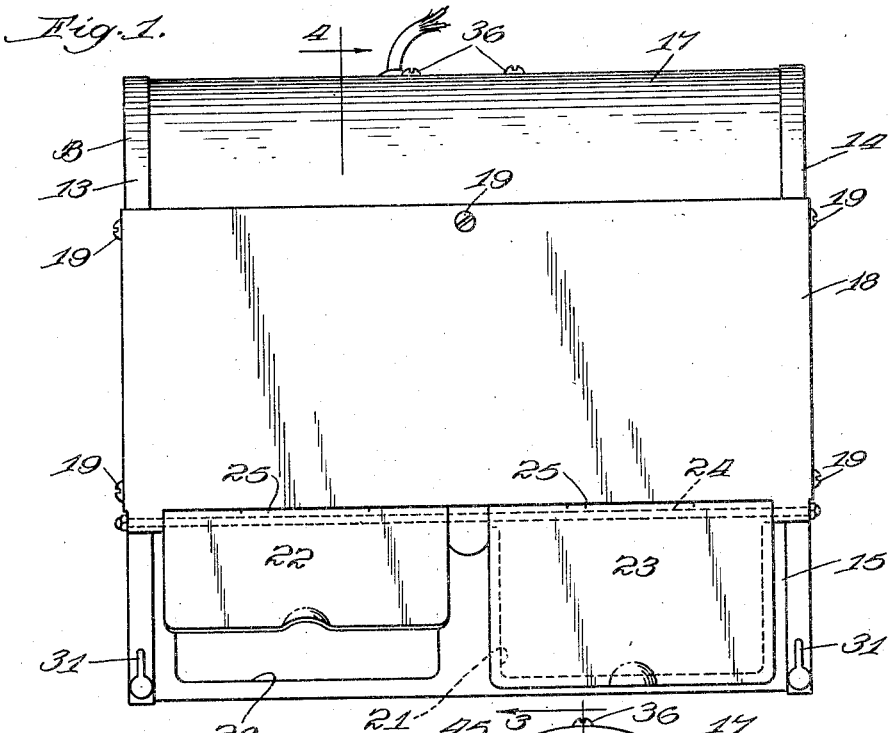

Oct. 18, 1938.   J. S. LOSEE   2,133,460
BLOWER STRUCTURE
Filed April 22, 1936   4 Sheets-Sheet 1

Inventor:
Joseph S. Losee.
By Dyrenforth, Lee, Chritton & Wiles
Attys.

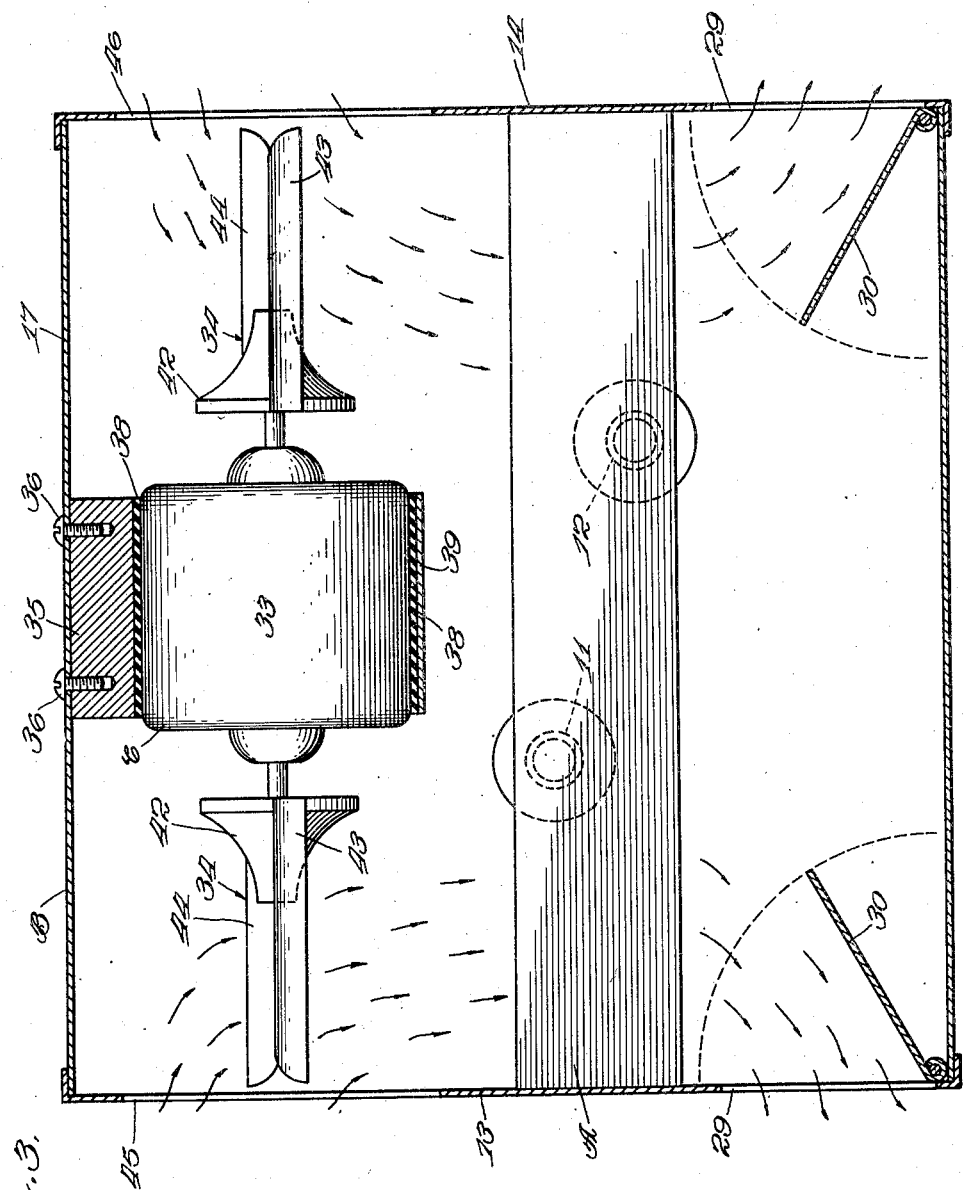

Oct. 18, 1938.  J. S. LOSEE  2,133,460
BLOWER STRUCTURE
Filed April 22, 1936    4 Sheets-Sheet 3
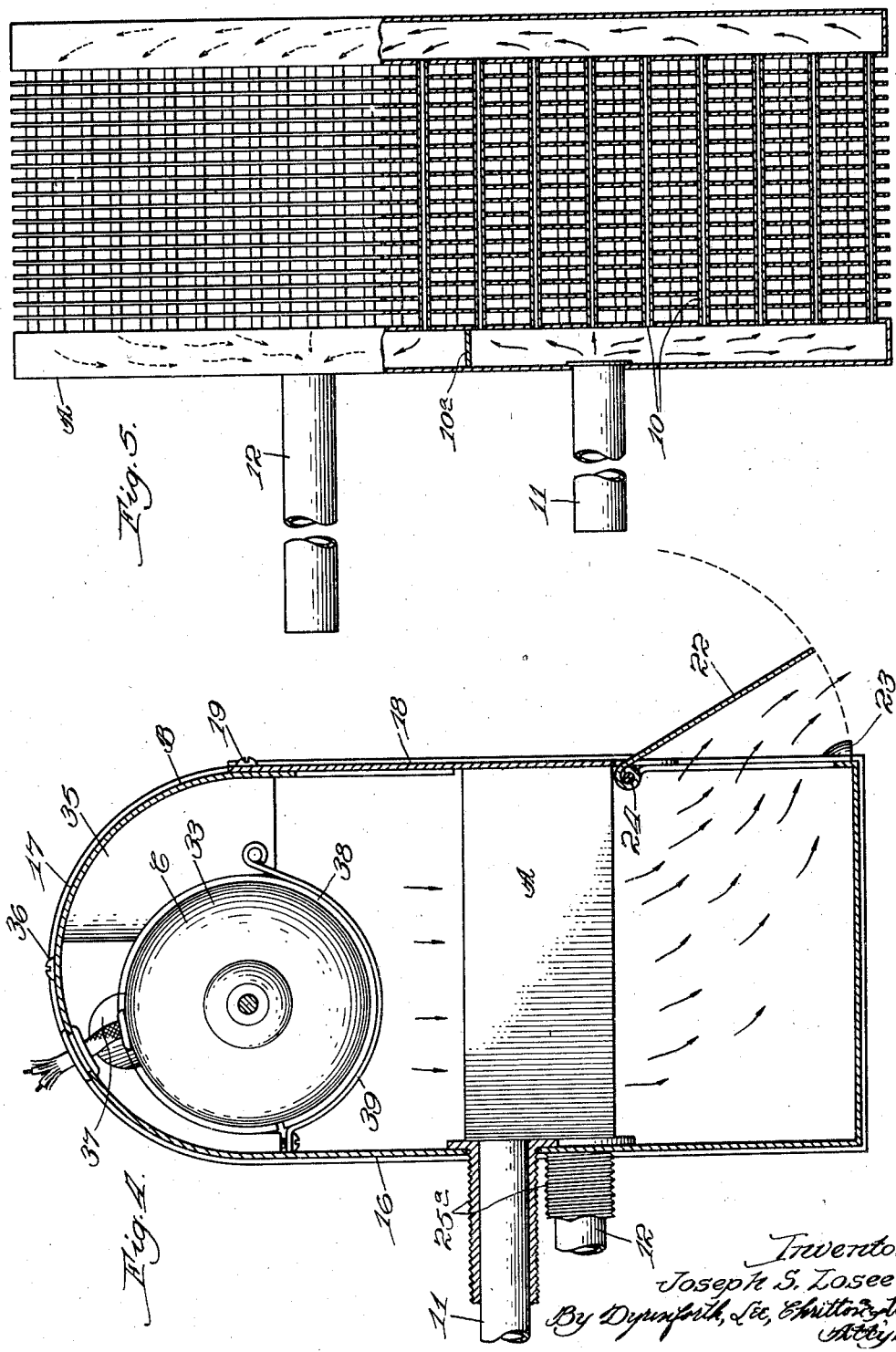

Oct. 18, 1938.   J. S. LOSEE   2,133,460
BLOWER STRUCTURE
Filed April 22, 1936   4 Sheets-Sheet 4
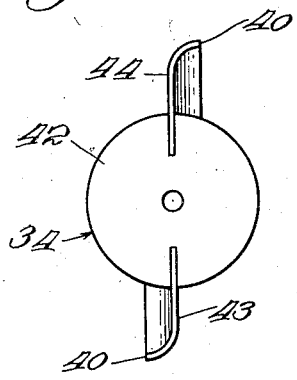
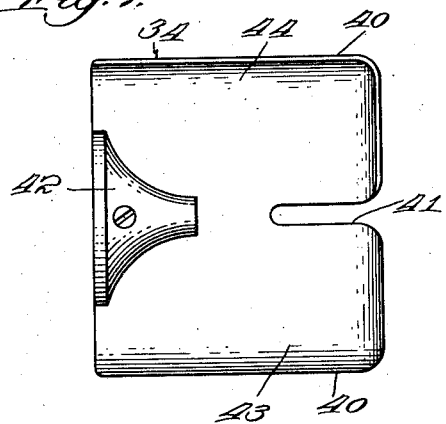
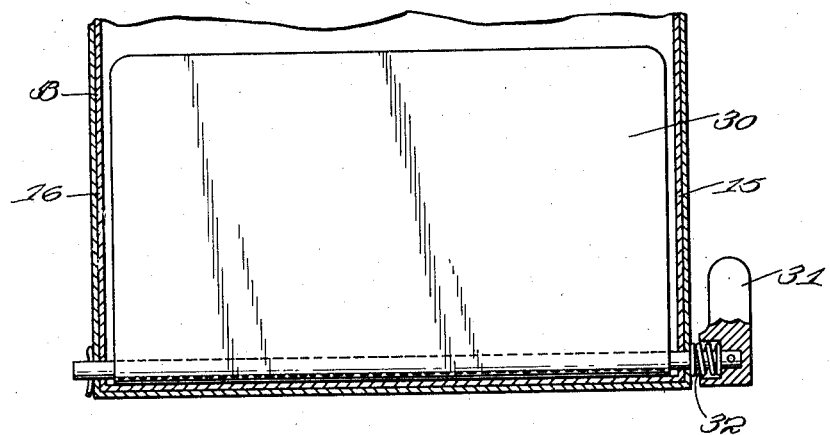
Inventor:
Joseph S. Losee.

Patented Oct. 18, 1938

2,133,460

UNITED STATES PATENT OFFICE 2,133,460

BLOWER STRUCTURE

Joseph S. Losee, Hebron, Ill.

Application April 22, 1936, Serial No. 75,848

4 Claims. (Cl. 230—134)

This invention relates to a heater and more particularly to a hot water heater for use in automobiles and other vehicles.

An object of the invention is to provide a heater which will distribute warm air evenly about the passenger compartment of an automobile and which may be adjusted to distribute warm air according to the desires of the passengers. Another object is to provide a heater which may be mounted flush against the dashboard of a vehicle, and which will not protrude forwardly to get in the way of gear shift levers, brake levers, or other equipment mounted in the front of a motor vehicle. A further object is to provide a heater having improved fan means for causing circulation of air therethrough.

In the ordinary arrangement for a vehicle heater a core through which water from the cooling system may circulate is mounted at some distance from the dashboard, and mounted to the rear of the core and in front of the dashboard is an electric motor and fan arranged to force air forwardly through the core. Such an arrangement necessarily requires that the heater be supported quite a distance in front of the dashboard, which means that the heater may be in the way of gear-shift levers or other equipment, and also being mounted so far forward, the heater is more inclined to vibrate.

My heater is so arranged that it may be attached flatly against the dashboard where it is out of the way of equipment. This arrangement also eliminates excessive vibration.

Further objects and advantages of my invention will appear as the specification proceeds.

In the drawings—

Figure 2:
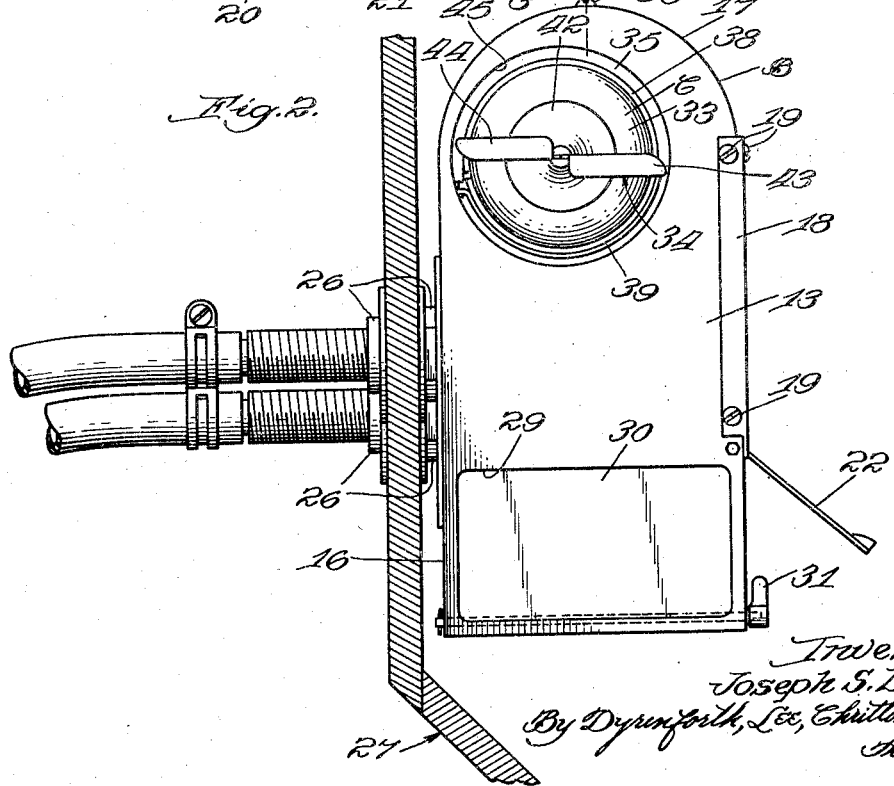

Figure 1 is a front view in elevation of an embodiment of the invention; Figure 2, a side view in elevation showing the heater mounted on a dashboard of a motor vehicle; Figure 3, a sectional view of the upper portion of the heater, the section being taken at line 3 of Figure 2, and showing the normal circulation of air through the heater; Figure 4, a sectional view as seen from line 4 of Figure 1; Figure 5, a detail view of the core and its connections; Figure 6, a detail view of a fan as seen from its end nearest the motor; Figure 7, a detail plan view of a fan; and Fig. 8, a detail view showing the end door and means for attaching same.

In the illustrations given, A represents a core; B, the casing; and C, the means for forcing the circulation of air through the heater.

The core A may be of any well known construction suitable for radiating heat from a source such as water from the cooling system of an automobile. As shown in Figure 5, a system of pipes 10 may be arranged so that hot water is caused to flow therethrough. A partition 10$^a$ is centrally placed behind pipes 10 and operates to prevent incoming water from reaching outlet pipe 12 without first passing twice through the pipes 10.

The casing B is preferably made of metal and may comprise end pieces 13 and 14, and front and rear sides 15 and 16. The top portion 17 is rounded and has a shape similar to a half-cylinder. The front side 15 has a center piece 18 which is fastened to the ends and top portion only by screws 19, and has in its lower portion openings 20 and 21 which serve as outlets for heated air. Over these outlets are doors 22 and 23, hinged at the top of the openings and adapted to control the size of these openings. As seen more clearly in Figures 1 and 4, the metal at the top edge of the door may be turned about a pin 24 to form a convenient hinge. The central top edge of each door may accommodate a spring 25 adapted to compensate the weight of the door when open.

At the rear side of casing 16 are openings for admitting pipes 11 and 12. Received within these openings and about pipes 11 and 12 are hollow fittings 25$^a$. Fittings 25$^a$ are threaded exteriorly and provided with a nut 26 which may be tightened on the outside of a dashboard to firmly secure the heater. Figure 2 shows the heater as attached to a dashboard 27.

The core A occupies only the central portion of casing B, the space within the casing above the core being occupied by means for causing circulation of air downwardly through the core, and the space below the core being employed as a warm air box from which warm air is distributed to the passenger compartment of the motor car.

Near the top of ends 13 and 14 and nearer the rear side of the casing are air inlet openings 45 and 46. These openings are circular in form and have diameters substantially equal to the width of the fans used.

Ends 13 and 14 also have warm air outlet openings in their lower portions. As seen in Figure 2, outlet opening 29 appears in the end of the casing and below the core A. Pivoted at the lower edge of openings 29 are doors 30 which control the amount of air permitted to escape through openings 29. Doors 30 are arranged to swing inwardly of the casing to open, and due to this feature also operate to guide the distribution of warm air within the casing. Figure 8 shows more clearly how a lever 31 may be located on the front of the casing to provide a convenient means for operating door 30. A spring 32 may be placed between the front of the casing and lever 31. This spring produces friction at the door joint so that the door will remain in any desired position.

In the embodiment shown, the means for producing a circulation of air through the heater consists of an electric motor 33 centrally mounted in the top portion of the casing, and fans 34 mounted on each end of the motor shaft.

In order to firmly mount the motor, a block 35, having a rounded contour is provided. Block 35 fits up in the rounded top portion of the casing and is firmly secured thereto by screws 36. As shown more clearly in Figure 4, block 33 has a part-cylindrical under surface adapted to receive the cylindrical form of the motor, and has an aperture 37 for admitting wires to the motor. Preferably a layer of resilient material 38 is placed about the motor. Soft rubber has been found to be a satisfactory resilient material for this purpose. The motor and layer of resilient material is held in place by means of a clamp 39 pivoted to block 35 at one end and secured to block 35 at the other end by some kind of releasable means. Such a mounting makes the motor very secure, but yet allows much of the vibration inherent in a motor to be absorbed.

The fans 34, shown in detail in Figures 6 and 7, have two blades which are of general rectangular form and are adapted to revolve about a central longitudinal axis, one blade being disposed on each side of the axis. Each blade has cupped edges 40, the blades on opposite sides of the axis being cupped in opposite directions. Blade 43, shown nearer the front of the heater, is cupped downwardly, while blade 44, shown nearer the rear side of the heater, is cupped upwardly.

At the outer end of the fans and at their center of rotation are slots 41 which extend inwardly from the end of the fan. Securing the blades of the fan to the motor shaft are bases 42 of general conical shape into which the blades are attached and which are adapted to receive and secure the ends of the shaft through the center of their inward ends. The bases 42, in addition to their use infirmly securing the fans to the motor shaft, perform an important function in directing the inwardly moving current of air.

While in the illustrations given a fan of only two blades is shown, only one, or more than two blades, may be used if desired. The advantage of using the fan with two blades, however, is that it may be formed of a single piece of material and is evenly balanced in rotation.

While in the present embodiment I have shown the motor, fans and air inlet openings nearer the rear of the casing, an opposite arrangement may be had in which the motor, fans and air inlet openings are nearer the front side of the casing, in which case the rear blade should be cupped downwardly and arranged to move downwardly.

The operation of the heater may be clearly understood by first referring to the way in which the fans direct the air. As seen by Figures 2 and 3, rotation of the fan causing blade 43 to move downwardly produces a downward draft of air directed through the core. At the same time, it may be observed that blade 44 is moving upwardly and tending to direct air upwardly. However, air directed upwardly by blade 44 is caused to flow along the rounded contour of the top portion of the casing and proceed downwardly along the front side of the casing. Thus, both blades of the fan are effective in directing air downwardly through the core.

The downward draft of air from the fan tends to create a partial vacuum which draws air inwardly through the air inlet openings 45 and 46 at each end of the casing. Air rushing in through these openings to take the place of the downwardly moving air is immediately caught by the cupped edges of the blades and urged inwardly and toward the axis of rotation. The central slot 41 facilitates this movement. The air, proceeding centrally and inwardly along the axis of the blades, meets the conical surface of the base 42, and is thrown outwardly where it is directed downwardly by the fan blades as described before.

Hot water from the cooling system of the motor vehicle is admitted into the core through water inlet pipe 11, and after circulating through the core A, is drawn off through water outlet pipe 12. The downwardly moving air currents from the fans 34 proceed through the core A, and are heated through contact with the pipes 10 of the core. The air currents below the core, now heated, are distributed from the heater through front outlet openings 20 and 21, or through the end air outlet openings 29, or through all or either of these openings as desired by the passenger.

Such an arrangement of parts makes possible the mounting of the heater flush with the dashboard of a motor car. The rear side of the casing may be securely fastened directly to the dashboard. Also in such an arrangement, both motor and fans are wholly within the heater casing, and excessive noise and the hazard of open fans is entirely eliminated.

The end air outlet openings 29 enable warm air to be distributed directly to each side of the floor board. Other heaters have been provided with attachments for deflecting air to the floor board directly in front of the heater, but such does not warm the feet of passengers sitting on either side of the heater. My construction makes it possible to heat all parts of a motor car adequately without making it uncomfortably warm for the passenger sitting directly in front of the heater.

The foregoing detailed description has been given for clearness of understanding only, and no unnecessary limitations should be understood therefrom, but the appended claims should be construed as broadly as permissible, in view of the prior art.

I claim:

1. In a device of the character set forth, a fan comprising a rotatably mounted blade, said blade being of general rectangular shape but having its outer free end portions turned inwardly in the direction of rotation, and means for driving said fan.

2. In an air-flow device, a fan comprising a single blade of general rectangular shape arranged to revolve about its central axis, said blade having its side edges turned in the direction of rotation and its end edge portions also turned in the direction of rotation, and means for rotating said blade.

3. In an air-flow device, a fan comprising a single blade of general rectangular shape arranged to revolve about its central axis, said blade having its outer edge portion divided into two oppositely turned portions, each of said edge end portions being turned in the direction of rotation, means for supporting said blade for rotation, and means for rotating said blade.

4. In an air device, a fan comprising a blade of general rectangular shape arranged to revolve about its central axis, said blade having its end portion divided substantially centrally and said end portions turned in opposite directions, and means for rotating said blade.

JOSEPH S. LOSEE.